United States Patent
Huang

(10) Patent No.: US 8,270,101 B2
(45) Date of Patent: Sep. 18, 2012

(54) LENS AND RELATED LENS MODULE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 149 days.

(21) Appl. No.: 12/889,414

(22) Filed: Sep. 24, 2010

(65) Prior Publication Data

US 2012/0014000 A1    Jan. 19, 2012

(30) Foreign Application Priority Data

Jul. 19, 2010    (TW) ............................... 99123613 A

(51) Int. Cl.
G02B 7/02    (2006.01)
G02B 3/00    (2006.01)

(52) U.S. Cl. .................. 359/819; 359/811; 359/642

(58) Field of Classification Search .......... 359/694–704, 359/811–830, 642
See application file for complete search history.

(56) References Cited

U.S. PATENT DOCUMENTS

| | | | | |
|---|---|---|---|---|
| 5,361,168 A * | 11/1994 | Arai et al. | ...................... | 359/796 |
| 7,139,133 B2 * | 11/2006 | Bonitz et al. | ................... | 359/707 |
| 7,239,451 B2 * | 7/2007 | Suzuki et al. | .................. | 359/642 |
| 7,830,610 B2 * | 11/2010 | Nishizawa et al. | ........... | 359/642 |
| 8,079,702 B2 * | 12/2011 | Ballet et al. | .................... | 351/159 |

* cited by examiner

Primary Examiner — Mohammed Hasan
(74) Attorney, Agent, or Firm — Altis Law Group, Inc.

(57) ABSTRACT

A lens includes a central optically active part, and a peripheral optically inactive part surrounding the optically active part. The optically inactive part includes a first surface, an opposite second surface, and a side surface connected between the first surface and the second surface. The side surface includes a first support area, a glue guide area, and a second support area in the order written. The glue guide area has a first groove defined therein. The first groove extends from a first side of the glue guide area adjacent to the first support area to an opposite second side of the glue guide area next to the second support area.

20 Claims, 4 Drawing Sheets

LENS AND RELATED LENS MODULE

BACKGROUND

1. Technical Field

The present disclosure relates to a lens and a related lens module.

2. Description of Related Art

Lens modules are widely used in various portable electronic devices, such as, cell phones.

In assembly of a typical lens module, lenses are fastened in a barrel of the lens module by applying adhesive to a lens, which is assembled last into the barrel. However, if too much adhesive is applied, it may penetrate to the interface between the lens and another lens adjacent to the lens. Accordingly, a distance between the two lenses may be larger than desired, thus deteriorating imaging quality of the lens module.

Therefore, it is desirable to provide a new lens and a new lens module, which can overcome the above-mentioned limitations.

DETAILED DESCRIPTION

Figure 1:
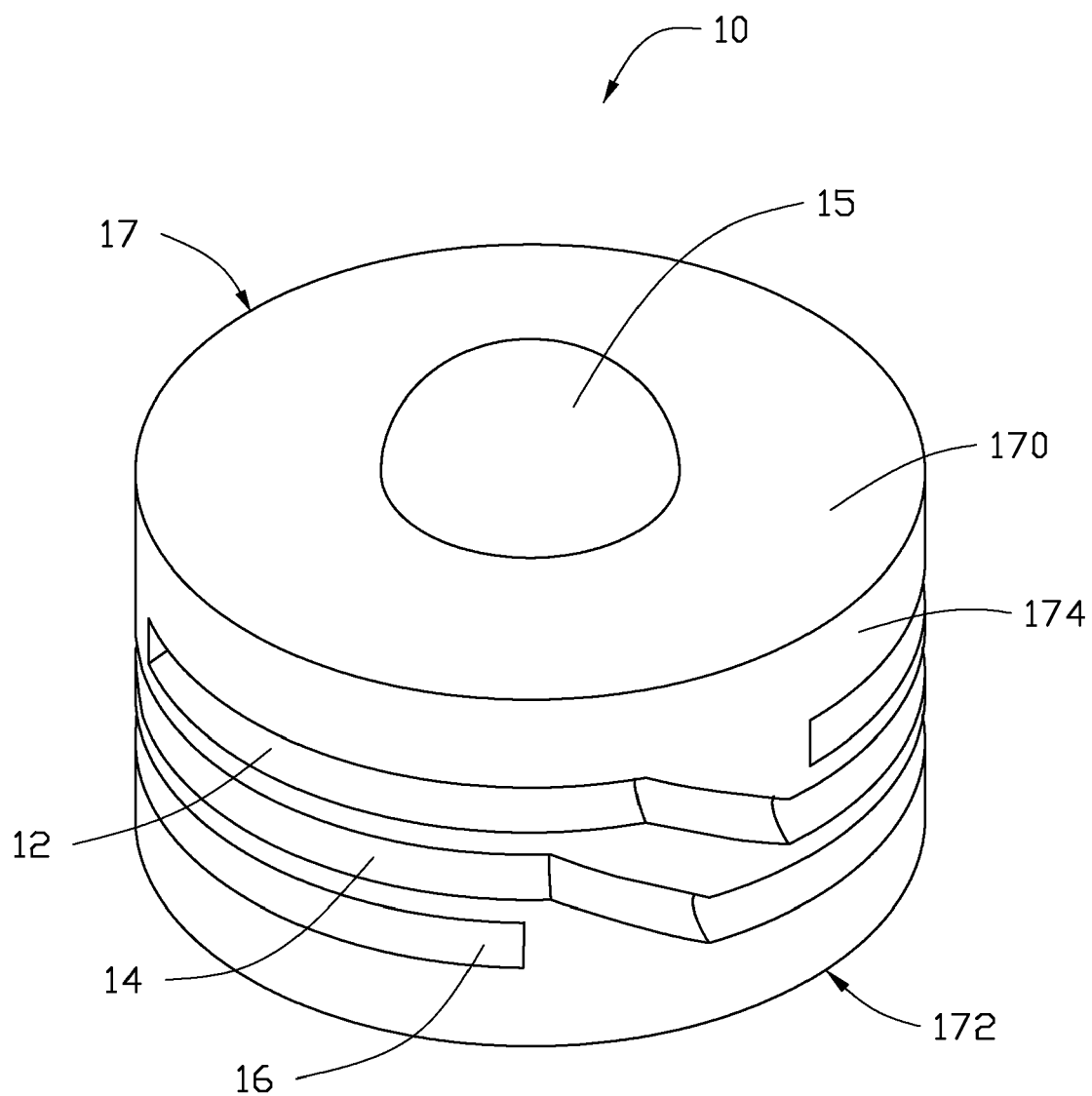
FIG. 1 is a perspective view of a lens having a cylindrical surface according to a first embodiment.
Figure 2:
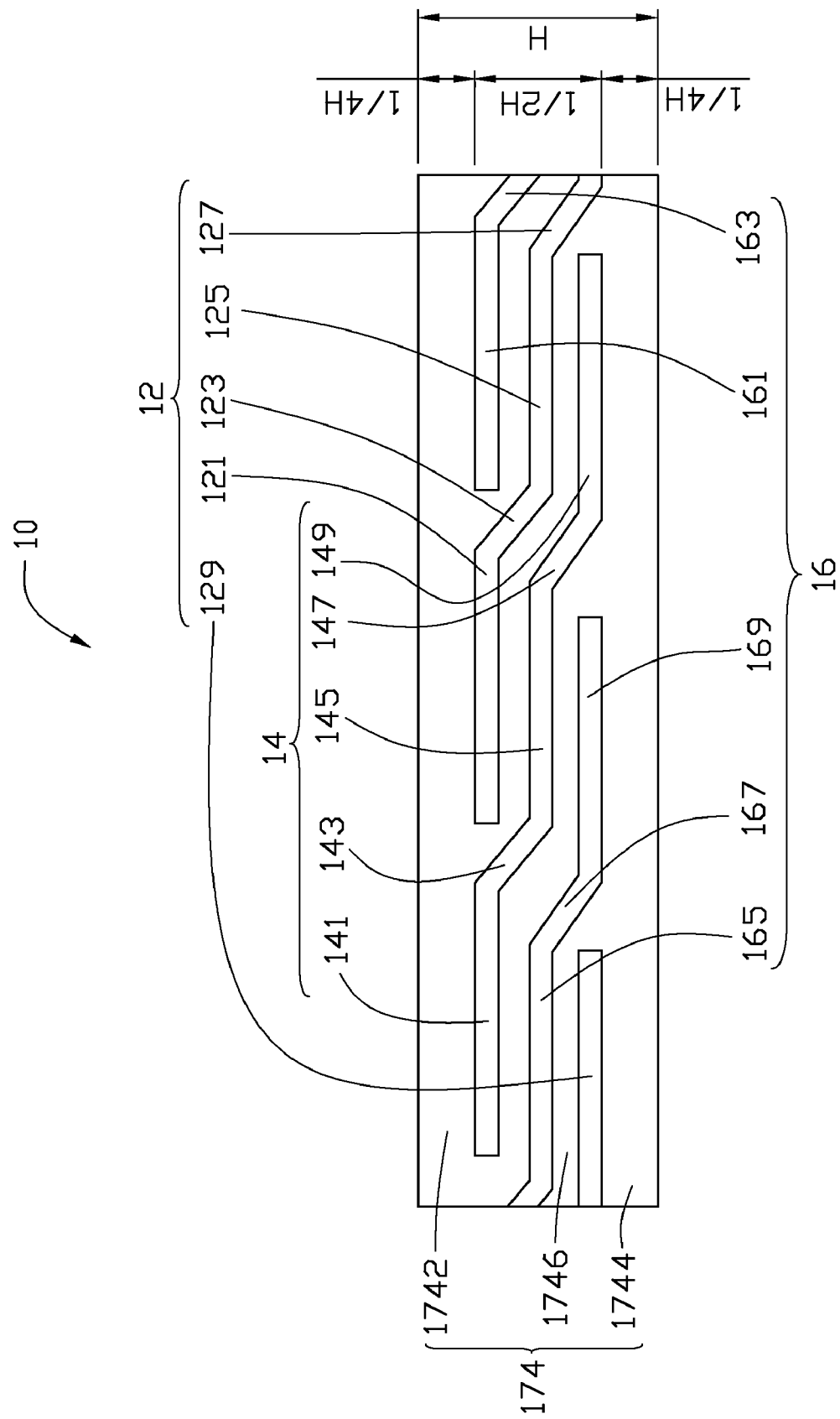
FIG. 2 is a plane view of the cylindrical surface of the lens of FIG. 1, the cylindrical surface being cut along a generatrix thereof and then unfolded.

Referring to FIGS. 1-2, a lens 10 according to a first embodiment is shown. The lens 10 includes a central optically active part 15 and a peripheral optically inactive part 17 surrounding the optically active part 15.

The inactive part 17 includes a top surface 170, a bottom surface 172, and a circumferential side surface 174 connected between the top surface 170 and the bottom surface 172. The side surface 174 includes a first support area 1742, a glue guide area 1746, and a second support area 1744. After the lens 10 is assembled into a barrel, the side surface 174 may contact the inner surface of the barrel. In the present embodiment, the side surface 174 is a cylindrical surface, and the top surface 170 and the bottom surface 172 are both flat surfaces.

The glue guide area 1746 of the side surface 174 has a first groove 12, a second groove 14, and a third groove 16. The first groove 12 includes a first horizontal portion 121, a first oblique portion 123, a second horizontal portion 125, a second oblique portion 127, and a third horizontal portion 129 in the order written. The first groove 12 continues from the first horizontal portion 121 to the third horizontal portion 129. The first horizontal portion 121, the second horizontal portion 125, and the third horizontal portion 129 each extend in a horizontal direction along the circumference of the lens 10. The first horizontal portion 121, the second horizontal portion 125 and the third horizontal portion 129 have substantially the same width. The first horizontal portion 121, the second horizontal portion 125 and the third horizontal portion 129 are substantially parallel to each other. The first oblique portion 123 and the second oblique portion 127 extend in a direction oblique relative to the horizontal direction. An included angle between the first horizontal portion 121 and the first oblique portion 123 is in an approximate range from 120 degrees to 150 degrees, and in the present embodiment, the included angle is about 135 degrees. An included angle between the second horizontal portion 125 and the second oblique portion 127 is in an approximate range from 120 degrees to 150 degrees, and in the present embodiment, the included angle is about 135 degrees.

The shape of the second groove 14 is substantially similar to that of the first groove 12. The second groove 14 includes a first horizontal portion 141, a first oblique portion 143, a second horizontal portion 145, a second oblique portion 147, and a third horizontal portion 149 in the order written.

The shape of the third groove 16 is substantially similar to that of the first groove 12. The third groove 16 includes a first horizontal portion 161, a first oblique portion 163, a second horizontal portion 165, a second oblique portion 167, and a third horizontal portion 169 in the order written.

The first horizontal portion 121 of the first groove 12, the first horizontal portion 141 of the second groove 14, and the first horizontal portion 161 of the third groove 16 are arranged along the circumference of the lens 10 in the order written. The top edge of the first horizontal portion 161 of the third groove 16 aligns with the top edge of the first horizontal portion 141 of the second groove 14. That is, the top edge of the first horizontal portion 161 of the third groove 16 and the top edge of the first horizontal portion 141 of the second groove 14 are both positioned in a plane substantially perpendicular to the central axis of the lens 10. The top edge of the first horizontal portion 141 of the second groove 14 aligns with the top edge of the first horizontal portion 121 of the second groove 12. The first horizontal portion 141 of the second groove 14, the second horizontal portion 165 of the third groove 16, and the third horizontal portion 129 of the first groove 12 are arranged from top to bottom along the central axis of the lens 10.

The thickness of the inactive part 17 of the lens is H, the distance between the top edge of the first horizontal portion 121 and the top surface 170 of the inactive part 17 is H/4, the distance between the bottom edge of the third horizontal portion 169 and the bottom surface 172 of the inactive part 17 is H/4, and the distance between the top edge of the first horizontal portion 121 and the bottom edge of the third horizontal portion 169 is H/2. The first horizontal portion 121, the second horizontal portion 145 and the third horizontal portion 169 are substantially parallel to each other. The first horizontal groove 121, the second horizontal groove 145, and the third horizontal groove 169 are uniformly distributed in a central area of the side surface 174 with the thickness of H/2.

Similarly, the first horizontal portion 141, the second horizontal portion 165 and the third horizontal portion 129 are substantially parallel to each other. The first horizontal portion 141, the second horizontal portion 165 and the third horizontal portion 129 are uniformly distributed in a central area of the side surface 174 with the thickness of H/2.

Similarly, the first horizontal portion 161, the second horizontal portion 125, and the third horizontal portion 149 are substantially parallel to each other. The first horizontal portion 161, the second horizontal portion 125 and the third horizontal portion 149 are uniformly distributed in a central area of the side surface 174 with the thickness of H/2.

Figure 4:
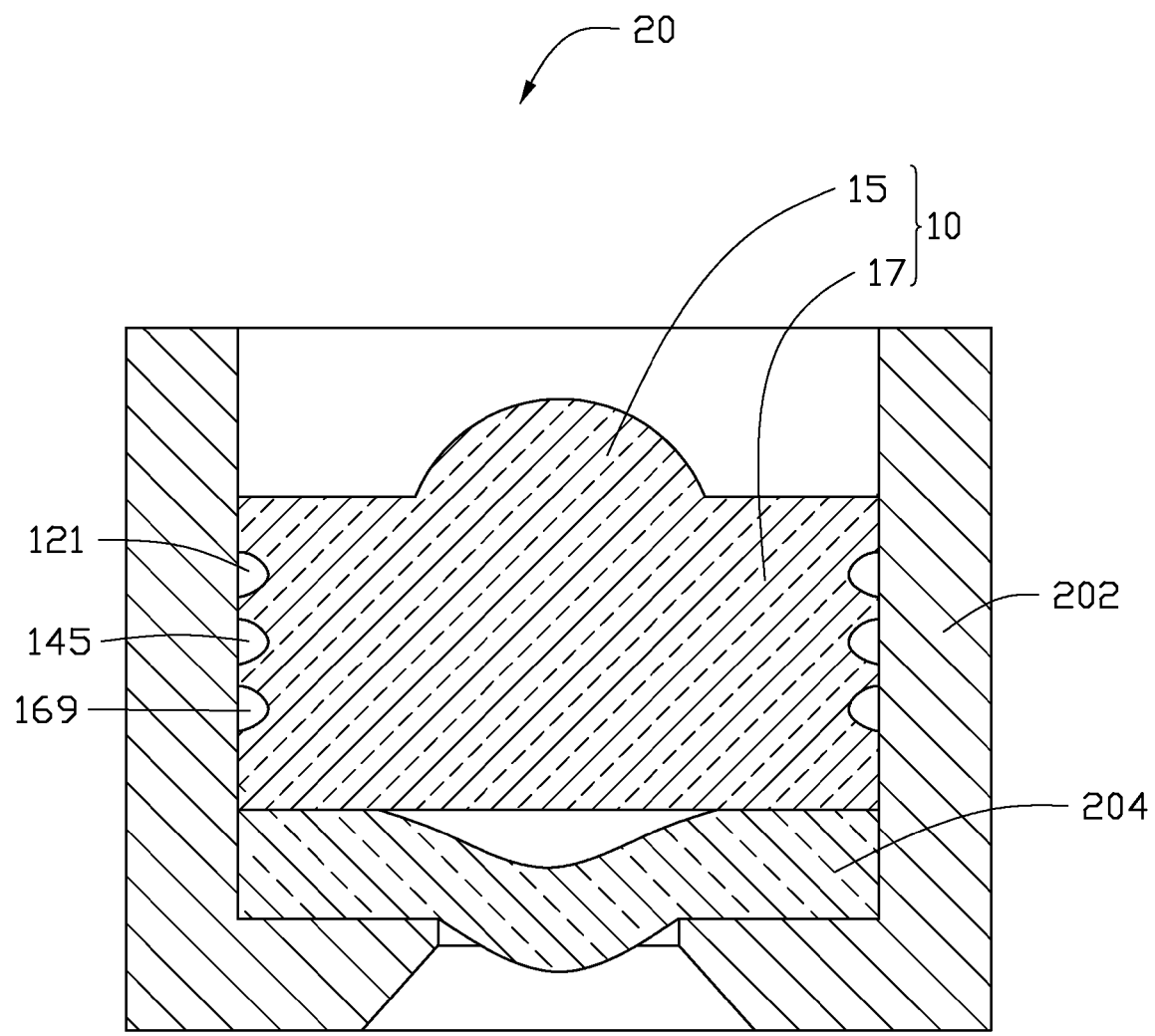
FIG. 4 is a cross-sectional view of a lens module according to a third embodiment.

In the present embodiment, the first groove 12 is a semi-ellipse in cross-section (referring to FIG. 4). In other embodiments, the first groove 12 may be U-shaped, V-shaped, or semi-circular.

In alternative embodiments, the lens 10 may only include the first groove 12 and the second groove 14. In other embodiments, the lens 10 may further include more grooves besides the first grooves 12, the second grooves 14, and the third grooves 16, and all these grooves are arranged periodically as described above.

In alternative embodiments, the first groove 12 may only include the first horizontal portion 121, the first oblique portion 123, and the second horizontal portion 125. In other embodiments, the first groove 12 may further include more horizontal portions and more oblique portions, arranged as previously described. The second groove 14 and the third groove 16 may be alternatively arranged the same as the first groove 12 as described in this paragraph.

In alternative embodiments, the first groove 12 may only include the first horizontal portion 121, the first oblique portion 123, and the second horizontal portion 125. In other embodiments, the first groove 12 may further include more horizontal portions and more oblique, arranged as previously described. The second groove 14 and the third groove 16 may be alternatively arranged the same as the first groove 12 as described in this paragraph.

In alternative embodiments, the first groove 12 may be a vertical groove, or an oblique groove extending in a single direction. For example, the first groove 12 may be an oblique groove extending from a first side of the glue guide area 1746 adjacent to the first support area 1742 to an opposite second side of the glue guide area 1746 next to the second support area 1744.

Figure 3:
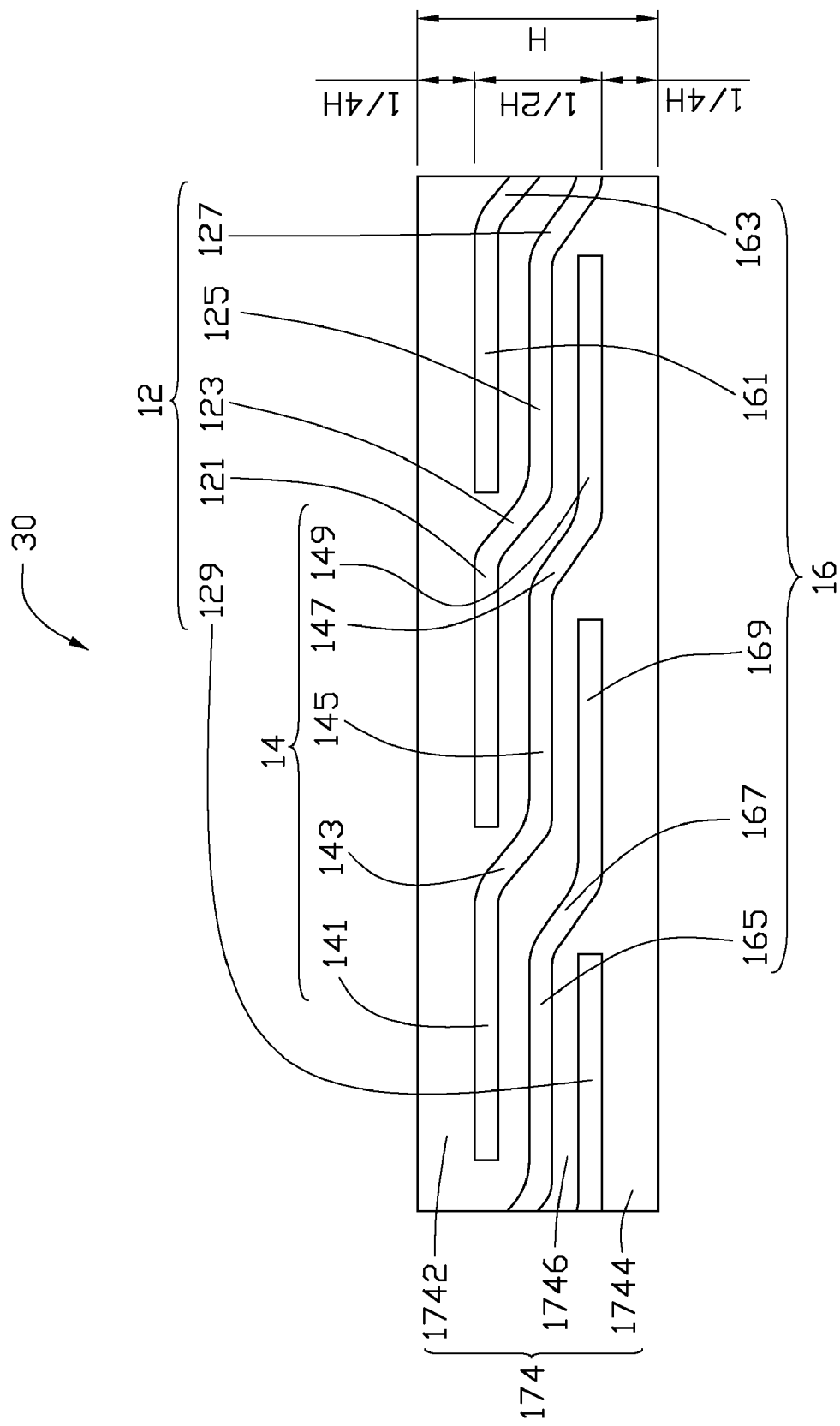
FIG. 3 is a plane view of a cylindrical surface of a lens in accordance with a second embodiment, the cylindrical surface being cut along a generatrix thereof and then unfolded.

Referring to FIG. 3, a lens 30 according to a second embodiment is shown. The lens 30 is similar to the lens 10 except that each joint between each horizontal portion (e.g., the first horizontal portion 121) and a respective oblique portion (e.g., the first oblique portion 123) is arc-shaped.

Referring to FIG. 4, a lens module 20 in accordance with a third embodiment is shown. The lens module 20 includes a barrel 202, the lens 10 of the first embodiment, and another lens 204. The lenses 10 and 204 are accommodated in the barrel 202.

Referring to FIGS. 1-2, and 4, in assembly, glue is applied to the top surface 170 of the lens 10 so that the lens 10 is fastened in the barrel 202. The second support area 1744 is capable of blocking glue from penetrating to the lens 204. Once the glue flows into the gap between the side surface 174 of the lens 10 and the inner surface of the barrel 202, the glue will flow along the first groove 12, the second groove 14, and the third groove 16. The horizontal portions (e.g., the first horizontal portion 121, the second horizontal portion 125, and the third horizontal portion 129) of the grooves guide the glue to diffuse horizontally. Simultaneously, the oblique portions (e.g., the first oblique portion 123) guide the glue to flow vertically so that the glue further diffuses horizontally. It is less likely for the glue to flow to the interface between the lens 10 and the lens 204, thus avoiding influencing the distance between the lens 10 and the lens 204. Therefore, the imaging quality of the lens module 20 is enhanced.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A lens comprising:
   a central optically active part; and
   a peripheral optically inactive part surrounding the optically active part, the optically inactive part comprising a first surface, an opposite second surface, and a circumferential side surface connected between the first surface and the second surface, the side surface comprising a first support area adjacent to the first surface, a second support area adjacent to the second surface, and a glue guide area located between the first and second support areas, the glue guide area having a first groove defined therein, the first groove extending from the first support area to the second support area along a circumferential direction of the lens, the first groove comprising a first horizontal portion, a second horizontal portion, and a first oblique portion obliquely connected between the first horizontal portion and the second horizontal portion, and the first horizontal portion and the second horizontal portion being parallel to the first surface and the second surface respectively.

2. The lens of claim 1, wherein an included angle between the first horizontal portion and the first oblique portion is in a range from 120 degrees to 150 degrees.

3. The lens of claim 1, wherein a joint between the first horizontal portion and the first oblique portion is arc-shaped.

4. The lens of claim 1, wherein a joint between the second horizontal portion and the first oblique portion is arc-shaped.

5. The lens of claim 1, wherein the glue guide area further comprises a second groove defined therein alongside the first groove, the second groove comprises a first horizontal portion coplanar with the first horizontal portion of the first groove, a second horizontal portion coplanar with the second horizontal portion of the first groove, and a first oblique portion obliquely connected between the first horizontal portion and the second horizontal portion.

6. The lens of claim 5, wherein a distance between the second horizontal portion of the first groove and the second surface is ¼ of a thickness of the optically inactive part, and a distance between the first horizontal portion of the second groove and the first surface is ¼ of a thickness of the optically inactive part.

7. The lens of claim 5, wherein the second horizontal portion of the first groove is parallel to the first horizontal portion of the second groove.

8. The lens of claim 5, wherein the first horizontal portion of the first groove is coplanar with the first horizontal portion of the second groove.

9. The lens of claim 5, wherein the second horizontal portion of the first groove is coplanar with the second horizontal portion of the second groove.

10. The lens of claim 5, wherein an included angle between the first horizontal portion of the second groove and the first oblique portion of the second groove is in an approximate range from 120 degrees to 150 degrees.

11. The lens of claim 5, wherein the first groove is spaced from the second groove.

12. A lens module comprising:
    a barrel; and
    a lens received in the barrel, the lens comprising:
       a central optically active part; and
       a peripheral optically inactive part surrounding the optically active part, the optically inactive part comprising a first surface, an opposite second surface, and a circumferential side surface connected between the first surface and the second surface, the side surface comprising a first support area adjacent to the first surface, a second support area adjacent to the second surface, and a glue guide area located between the first and second support areas, the glue guide area having a first groove defined therein, the first groove extending from the first support area to the second support area around the optical axis of the lens, the first groove comprising a first horizontal portion, a second horizontal portion, and a first oblique portion obliquely connected between the first horizontal portion and the second horizontal portion, the first horizontal portion and the second horizontal portion each extending in a horizontal direction, and the first oblique portion extending in a direction oblique to the horizontal direction.

13. The lens module of claim 12, wherein an included angle between the first horizontal portion and the first oblique portion is in a range from 120 degrees to 150 degrees.

14. The lens module of claim 12, wherein a joint between the first horizontal portion and the first oblique portion is arc-shaped.

15. The lens module of claim 12, wherein a joint between the second horizontal portion and the first oblique portion is arc-shaped.

16. The lens module of claim 12, wherein the glue guide area further comprises a second groove defined therein, the second groove comprises a first horizontal portion, a second horizontal portion, and a first oblique portion connecting the first horizontal portion and the second horizontal portion, both of the first horizontal portion of the second groove and the second horizontal portion of the second groove extend in the horizontal direction, the first oblique portion of the second groove extends in a direction oblique to the horizontal direction, and a top edge of the first horizontal portion of the first groove is coplanar with that of the first horizontal portion of the second groove.

17. A lens comprising:
a central optically active part; and
a peripheral optically inactive part surrounding the optically active part, the optically inactive part comprising a first surface, an opposite second surface, and a circumferential side surface connected between the first surface and the second surface, the first and second surfaces being flat surfaces and parallel to each other, the side surface comprising a first support area adjacent to the first surface, a second support area adjacent to the second surface, and a glue guide area located between the first and second support areas, the glue guide area having a first groove defined therein for guiding glue, and the first groove extending from the first support area to the second support area along a circumferential direction of the lens.

18. The lens of claim 17, wherein the first groove comprises a first horizontal portion, a second horizontal portion, and a first oblique portion obliquely connected between the first horizontal portion and the second horizontal portion, the first horizontal portion and the second horizontal portion being parallel to the first surface and the second surface respectively.

19. The lens of claim 18, wherein an included angle between the first horizontal portion and the first oblique portion is in a range from 120 degrees to 150 degrees.

20. The lens of claim 18, wherein the glue guide area further comprises a second groove defined therein alongside the first groove, the second groove comprises a first horizontal portion coplanar with the first horizontal portion of the first groove, a second horizontal portion coplanar with the second horizontal portion of the first groove, and a first oblique portion, and the first oblique portion of the second groove is obliquely connected between the first horizontal portion of the second groove and the second horizontal portion of the second groove.

* * * * *